May 29, 1934.  T. H. SEELY  1,960,287
SAFETY DEVICE
Original Filed May 12, 1920  3 Sheets-Sheet 1

INVENTOR-
Thomas H. Seely
By his Attorney,
Nelson W. Howard

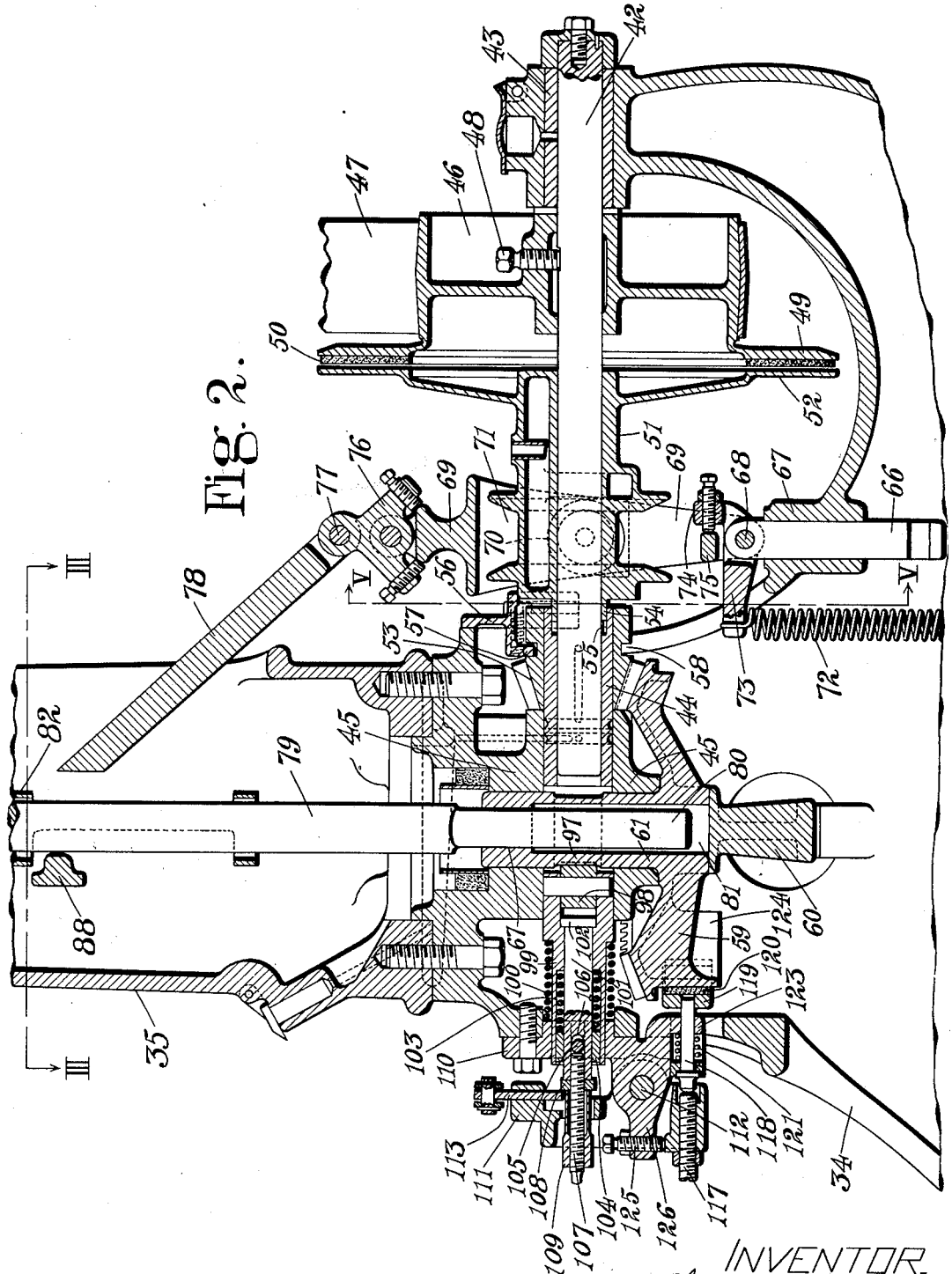

May 29, 1934.   T. H. SEELY   1,960,287
SAFETY DEVICE
Original Filed May 12, 1920   3 Sheets-Sheet 3
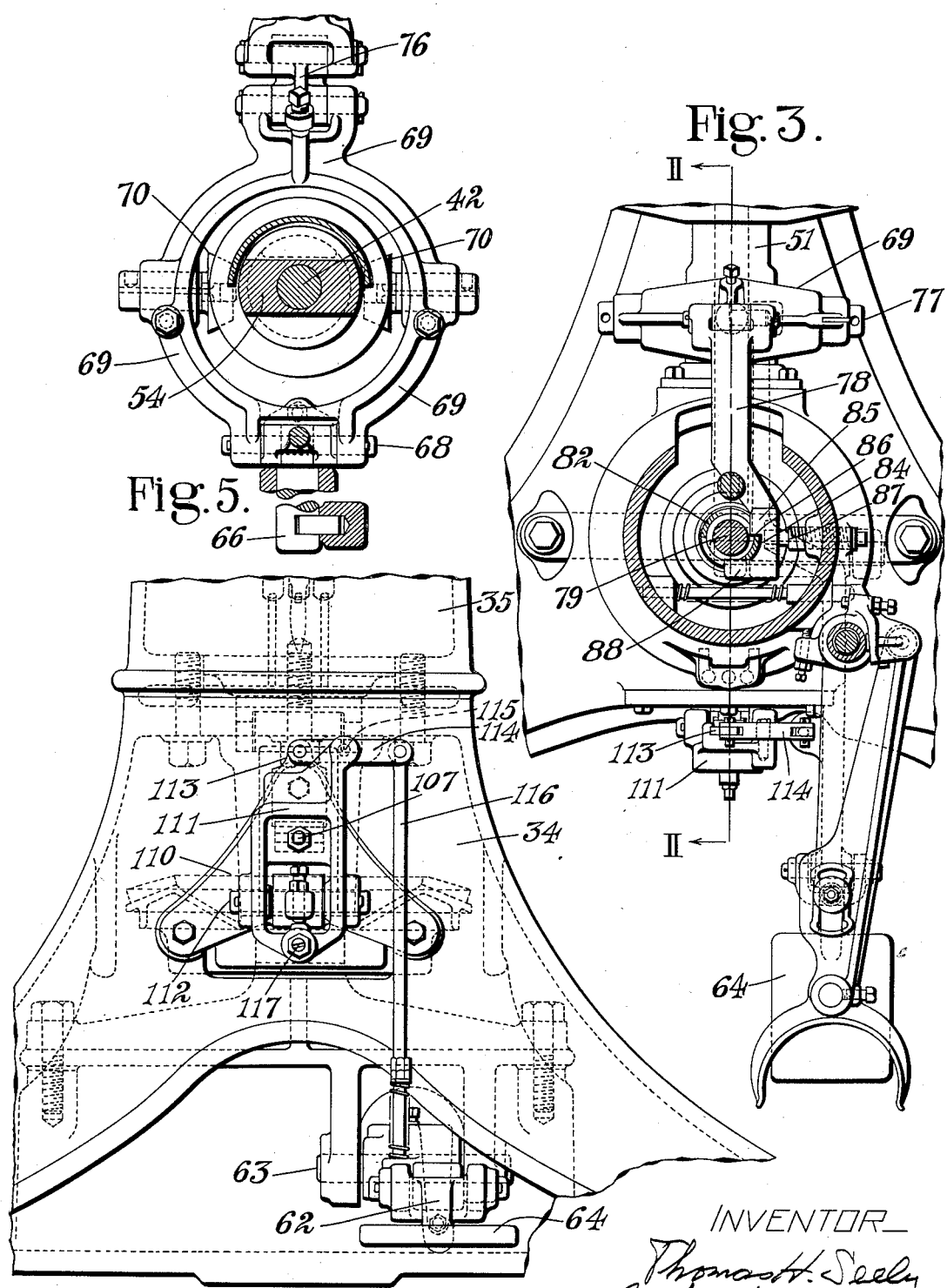

Patented May 29, 1934

1,960,287

UNITED STATES PATENT OFFICE 1,960,287

SAFETY DEVICE

Thomas H. Seely, Melrose, Mass., assignor to United Shoe Machinery Corporation, Paterson, N. J., a corporation of New Jersey Original application May 12, 1920, Serial No. 380,897. Divided and this application December 30, 1929, Serial No. 417,474

19 Claims. (Cl. 192—144)

This invention relates to stopping and starting mechanisms and particularly to such mechanisms when employed in power-driven treadle-controlled machines such, for example, as hand method lasting machines of the type disclosed in United States Letters Patent No. 1,776,396, granted September 23, 1930, on an application of which the present application is a division.

Many power-operated machines, particularly those used in the manufacture of shoes, are treadle controlled and are preferably stopped with their operating instrumentalities in a predetermined position. It is necessary at times to adjust, test or repair such machines and in so doing to turn them over by hand while the power is on.

Objects of this invention are to provide improved mechanism which will afford greater safety to the operator, who is working on the machine to put it in order, by preventing it from being accidentally tripped, and which will afford greater convenience to the operator when the machine is being turned over by hand, and to provide improved starting and stopping mechanism for driving the machine when doing its work and insure its stopping at a predetermined point in its cycle.

Accordingly, a feature of the present invention consists in an organization comprising a shaft, a brake to arrest rotation of the shaft, a clutch for controlling transmission of power to the shaft, manually operated means, such as a treadle, for first releasing the brake and then setting the clutch, and means, preferably adjustable at the will of the operator, to prevent movement of the manually operated means to set the clutch while permitting release of the brake.

Another feature of the present invention consists of manually actuated means for operating the machine in addition to the power means and mechanism controlled by the manually actuated means for rendering the power means ineffectual. In the illustrated machine means is provided for preventing operation of the manual means until after the power actuated means is rendered ineffectual. The effect of the illustrated novel construction with respect to the power and manual operation of the machine is to prevent the power means from being applied to operate the machine while the manual means is being used, and, conversely, to prevent the use of a hand operated means when the power means is being used. In the machine as illustrated, a transmission shaft is provided to which may be applied the actuating force either of the power means or manual means selectively.

In the operation of various kinds of machines, such as hand method lasting machines, it is desirable to bring the machine to rest at a particular point in its cycle, for instance, with the gripper open. This condition is usually attained through the expertness of the operator but in the hands of an inexperienced operator, it is difficult to bring the machine to rest at the proper point in its cycle of operation. A further feature of the present invention in this respect consists of a swinging arm which is actuated by driven means for applying the brake when the treadle is released. In the illustrated machine this result is obtained by connecting one portion of the swinging arm temporarily to a plunger actuated by a cam on a clutch driven member and applying a brake through another portion of the swinging arm. The rotary driven member, which is to be stopped and rotation of which effects the application of the brake, is housed or encased within the machine frame, hence these portions of the automatic stop mechanism are so protected as to prevent injury to the operator.

In addition to the above features, the present invention includes other novel features and combinations of parts all of which will be hereinafter fully described in connection with the accompanying drawings which show one mechanical embodiment of the various new features and novel combinations of the parts.

In the drawings,

Fig. 2 is a longitudinal sectional view of a portion of the base of the machine taken along the line II—II of Fig. 3 and also showing the clutch mechanism;

Fig. 3 is a sectional plan view of a portion of the base of the machine, the section being taken along the line III—III of Fig. 2 looking toward the base;

Fig. 4 is a front elevation of a portion of the base of a machine;

Fig. 5 is a sectional view of a clutch actuating mechanism taken along the line V—V of Fig. 2.

Figure 1:
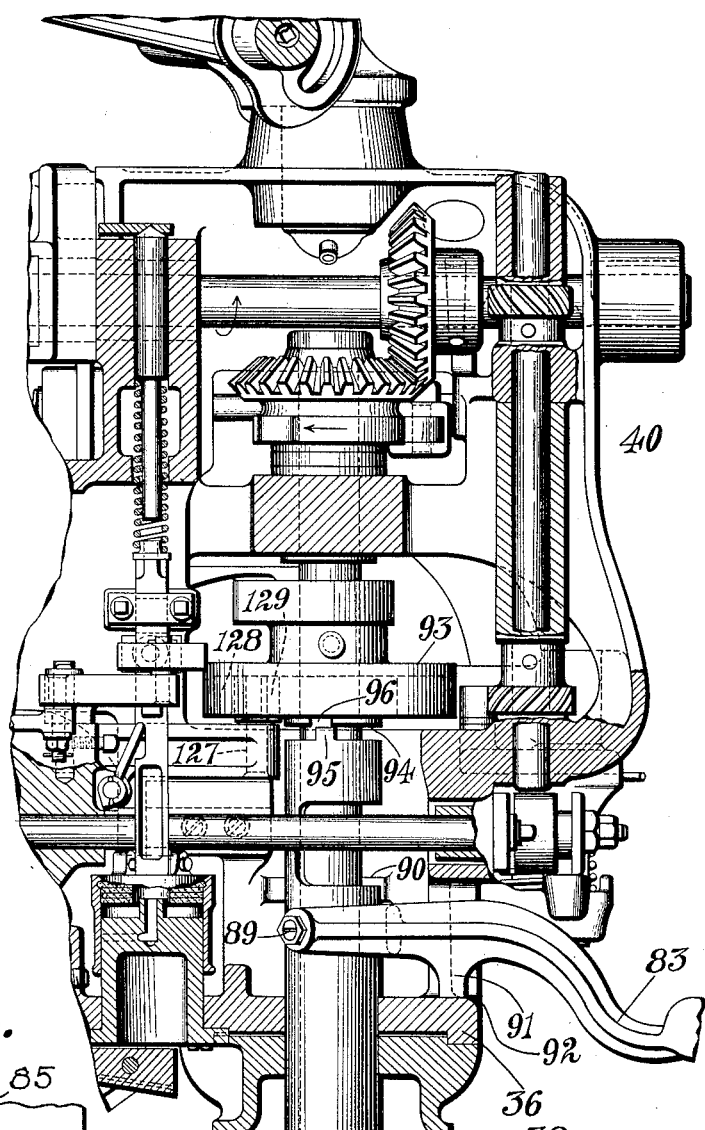
Fig. 1 is a view partly in section and partly in side elevation of the head of a machine showing the manual means for operating the machine.
Figure 6:
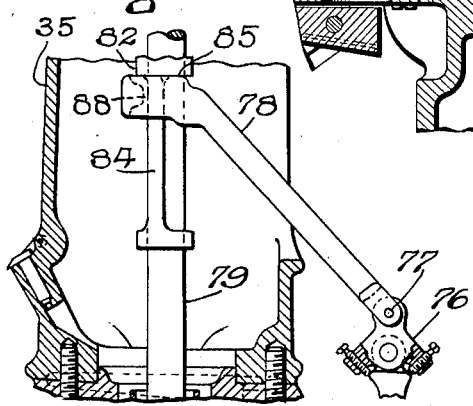
Fig. 6 is a detail view, partly in section, of a portion of the machine.

The machine frame comprises the base portion 34 from which rises the hollow column 35 into which telescopes the head supporting block 36, Fig. 1, which is adapted to be raised and lowered to suit the height of the workman by means usual in machines of this type. The head block 36 serves as a support for the head frame 40 on which the lasting devices are mounted.

The illustrated machine derives its power from a driving shaft mounted in the lower part of the machine frame, such driving shaft and its operative connection with the power-transmitting mechanism being best illustrated in Figs. 2, 3 and 5.

Mounted in suitable bearings in a lower or base portion 34 of the machine frame is a driving shaft 42, one end of which finds support in a bearing 43, Fig. 2, while the other end is supported in a bushing 44 mounted within the column or machine frame at 45. The driving shaft 42 has secured thereto a belt pulley 46, which may be driven from a suitable source of power, as for instance by a belt 47, from an overhead or line shaft. The pulley 46 is secured to the driving shaft 42 by a set screw 48 and is provided with a flange 49 faced with a suitable frictional material 50, Fig. 2, and forming one member of a friction clutch. The other member of the friction clutch consists of a sleeve 51 movable endwise on the driving shaft 42 and provided with a flange 52 which may at times be frictionally engaged with the driving pulley. The sleeve 51 is operatively connected to a bevel gear 53 by projections 54 which engage complemental recesses 55, Fig. 2, in the hub of the bevel gear. The bevel gear 53 is rotatably mounted upon the bushing 44 and is held in fixed relation lengthwise of the driving shaft by a holder 56 having a flange 57 engaging a circular groove 58 in the hub of the gear. By reason of the interengagement of the projections 54 and the recesses 55 as described, the sleeve 51 retains its driving connection with the gear 53 regardless of the position of the sleeve longitudinally of the driving shaft 42.

Mounted within and housed by the machine supporting frame is a clutch driven member illustrated as a transmission gear 59, Fig. 2, which meshes with the clutch driven bevel gear 53 and transmits power to the machine when the clutch is set. The transmission gear 59 is supported by a tie-beam 60 extending crosswise of the machine frame within the hollow base, and the hub portion 61 of the transmission gear has lateral support in the bearings 45. A treadle 62, Fig. 4, is pivotally mounted on the base of the machine frame at 63, and is provided with a foot-piece 64. The other end of the treadle 62 is pivotally connected with a sliding rod 66 which is movable in a guideway 67 and has connected at its upper end at 68 a swinging yoke 69. The yoke 69, as best indicated at Fig. 5, carries rollers 70 which engage a circular groove or track 71 formed on the sleeve 51. A spring 72 normally acts to hold the rod 66 and hence the yoke 69 in its lowered position, Fig. 2. In the illustrated machine, the spring 72 has one end attached to a lever arm 73 and the other end to a fixed part in the machine base. The other arm 74 of the lever has an adjusting screw which normally bears upon an abutment 75 formed on the yoke 69. The yoke 69 has adjustably connected to its upper end a block 76, Fig. 2, to which is pivotally connected at 77 a strut 78, the construction being such that should the upper end of the strut 78 be held from bodily movement to the left, Fig. 2, and the treadle be depressed, the yoke 69 will swing to the right about its pivotal connection 68 with the rod 66 and effect engagement of the clutch members, and hence power actuation of the driving shaft 42; but should the upper end of the strut 78 be permitted bodily movement, to the left, Fig. 2, when the treadle is depressed, the yoke 69 would not be swung to effect engagement of the clutch members. In other words, depression of the treadle always elevates the rod 66 and if the strut 78 is held against movement to the left, the yoke 69 will swing about its pivot, thereby effecting the engagement of the clutch members.

Housed by and extending upwardly within the column 35 of the machine frame is a transmission shaft 79, the lower end portion 80 of which is formed non-circular in cross section and telescopes within a correspondingly-shaped opening 81 formed in the hub of the transmission gear 59.

Loosely mounted upon the transmission shaft 79 is a sleeve 82, Figs. 2 and 3, which is capable of endwise and turning movement on the transmission shaft 79 by a hand-piece 83, Fig. 1, constituting the manually-operated element for turning the machine by hand.

The lower end portion of the sleeve 82 is provided with an abutment 84, Fig. 3, which may be conveniently formed by slotting the sleeve 82 longitudinally. The upper end portion of the strut 78 is provided with a head 85 which has a shoulder 86 adapted to rest against the abutment 84 of the sleeve. The head 85 is held against vertical movement and guided for lateral movement relative to the vertical axis of the shaft 79 by a pin 87 extending through the machine column. When the sleeve 82 is in the position indicated in Fig. 3, the shoulder 86 of the strut bears against the abutment 84 of the sleeve; and if the treadle be depressed with the parts in this position, the yoke 69 will be moved laterally to effect engagement of the clutch members. If, however, the sleeve 82 be turned backwardly, or clockwise, by the hand-piece 83 as hereinbefore described, the abutment 84 of the sleeve 82 will be moved backwardly from the shoulder 86 of the strut and free the upper end or head portion 85 of the strut to backward or lateral movement such that should the treadle be depressed, the upward movement of the yoke 69 will cause lateral movement of the upper head portion 85 of the strut without placing the clutch members in operative relation. To insure such lateral or backward movement of the head 85 of the strut when the sleeve 84 is turned clockwise, viewing Fig. 3, the head 85 has a portion 88, which is adapted to be engaged by the abutment 84 of the sleeve and positively moved to carry the upper end of the strut 78 backwardly as the sleeve is rocked on the transmission shaft. This insures that the power operation of the machine, by depression of the treadle, will be rendered impossible when the sleeve 82 is rocked in the manner described, by the hand-piece 83.

It is convenient at this point to describe the means provided for effecting the hand or manual operation of the machine, and the interdependence of such means and the power-operated means.

The hand-piece 83, Fig. 1, has a bifurcated end portion pivotally connected at 89 to the sleeve 82, and projecting from the head frame 40 of the machine is a locking ledge 90 under which one member of the bifurcated end portion of the hand-piece 83 extends when the machine is being operated by power, and a lug 91 on the hand-piece 83 at such time is engaged with a locking recess 92, the construction being such that when the machine is being operated by power, or is capable of being so operated, the abutment 84 of the sleeve 82 is positioned as indicated in Fig. 3 to prevent lateral movement of the head of the strut 78, and the hand-piece cannot be accidentally or otherwise manipulated to effect hand operation of the lasting means because the ledge 90 overlies one arm of the bifurcated end portion of the hand-piece 83 and prevents movement of the hand-piece about the lug 91 as a fulcrum to raise the sleeve 82. Secured to the transmission shaft 79 is a transmission cam 93, the hub portion 94 of which, Fig. 1, is provided with one or more recesses 96 adapted to be engaged by a projection 95 on the sleeve 82 when such sleeve is preliminarily rocked by the hand-piece 83 to bring the projection 95 into register with or opposite to one of the recesses 96. Assuming the parts to be positioned for power operation of the machine as indicated in Figs. 1 and 3, if it be desired to operate the machine manually, the hand-piece 83 is first lifted to dis-engage the lug 91 of the hand-piece from the locking recess 92, whereupon the hand-piece and sleeve 82 may be preliminarily moved about the transmission shaft 79 to bring a lug 95 of the sleeve opposite one of the notches 96 of the transmission cam. This movement of the hand-piece rocks the sleeve 82 to carry the abutment 84 at the lower end of the sleeve from the shoulder 86 of the head 85 at the upper end of the strut 78, and causes the head to be moved laterally, thus throwing the power-actuating means out of commission, even though the treadle be depressed. By this same movement the arm of the bifurcated end portion of the hand-piece is brought into position to clear the ledge 90 when moved vertically.

The outer end of the hand-piece may then be depressed to raise the sleeve 82 to engage the transmission cam and then the hand-piece may be further manipulated to turn the transmission cam, and, hence, the lasting means for operating the machine by hand. Conversely, when it is desired to operate the machine by power, after it has been operated manually, the outer end of the hand-piece is allowed to rise, thus disengaging the sleeve from the transmission cam, and then is moved laterally to place the lug 91 in the locking recess 92, whereupon the sleeve 82 is caused to rotate counterclockwise, Fig. 3, to place the abutment 84 of the sleeve against the shoulder 86 of the strut head. If the treadle be then depressed, the machine may be power driven. The radius of turning movement of the hand-piece 83 when operating the machine manually, is preferably about one-fifth of a circle; consequently, to turn the machine one revolution by hand, the hand-piece is required to be manipulated five times. This is a convenient arrangement of the parts, but of course the invention is not restricted in this respect, and the radius of movement may be larger or smaller, as circumstances may dictate.

When the machine is to be stopped, it is desirable that it be brought to rest at a predetermined point in its cycle. The mechanism provided by the present invention for accomplishing this result is best illustrated in Fig. 2. The transmission gear 59 housed within the machine column is provided with a cam 97 formed on the hub 61 of the transmission gear, upon which rides a roller 98 carried by a plunger 99 extending through the supporting column and guided for reciprocating movement. A spring 100 normally maintains the plunger 99 with the roller 98 in contact with the cam, but permits reciprocation of the plunger during rotary movement of the transmission gear. Mounted in the plunger 99 is a second plunger or catch carrier 101 having a head 102 normally pressed outwardly into contact with a shoulder on the plunger by a spring 103 which bears at its outer end against a collar 104 through which passes a pin 105. The plunger 101 has a slot 106 and an adjusting screw 107 is threaded into the plunger 101, the end of the screw being adapted to bear against the pin 105 under the stress of the inner spring 103 which acts upon the collar 104 and consequently normally forces the pin 105 along with the collar so that the pin bears against the end of the adjusting screw 107. The adjusting screw 107 carries a washer or collar 108, Fig. 2, held in place by a lock nut 109 on the screw 107, the construction being such that by manipulation of the lock nut 109 and screw 107, the tension of the spring 103 may be varied. The spring 103 is the yielding element through which the outward movement of the plunger 97 is transmitted to the brake, and the adjustment referred to enables the pressure of the brake to be regulated at will and to be yieldingly applied, as will presently appear.

Mounted on a bracket 110, secured to the lower portion of the machine frame, is a swinging or brake-applying arm 111 which is pivoted at 112 to the bracket. The swinging arm 111 carries a latch 113 connected to an arm 114 which is mounted at 115, Fig. 4, on the swinging arm 111. The outer end of the rocker arm 114 is connected to the treadle 62 by a link 116, the construction being such that when the treadle is released, the latch 113 will be moved into the path of the collar or catch 108 and transmit the yielding outward movement of the plunger to the swinging arm 111. The lower portion of the arm 111 is provided with an adjusting screw 117, Fig. 2, which normally bears against the head of a brake pin 118. The brake pin 118 is carried by a brake shoe 119 which may be faced with friction material 120, and a spring 121 is interposed between a shoulder 122 of the brake shoe and a fixed portion 123 of the machine frame to normally move the brake shoe into its non-braking position or outwardly.

The transmission gear 59 carries a flange 124 to receive the braking impact of the brake shoe. An adjusting screw 125 extending through a lug 126 formed on the bracket 110 limits the swinging movement of the swinging arm 111 to the right, or clockwise viewing Fig. 2, under the outward impulse of the spring 121. From the construction described it will be apparent that when the treadle 62 is released, to stop the power operation of the machine, the latch 113 will be moved into the path of the collar or catch 108 on the plunger, and as the plunger is moved outwardly by the cam 97 on the hub of the transmission gear 59, it will act yieldingly to apply the brake and effect stoppage of the machine in a predetermined position.

It will be apparent, from the construction above described, that, when the hand piece 83 is manipulated to release the abutment 84 from the strut 78, the treadle can be depressed without affecting the clutch or effecting power operation of the machine, and that such depression will act to release the latch 113 which holds the brake applying arm 111 in brake applying position and allow the spring 121 to retract the brake shoe 119

Having thus described my invention, what I claim as new and desire to secure by Letters Patent of the United States is:

1. In a device of the class described, the combination of a shaft, a brake to arrest rotation of the shaft, a clutch for controlling the transmission of power to the shaft, manually operated mechanism for first releasing the brake and then setting the clutch, and means to prevent movement of the manually operated mechanism to set the clutch while permitting release of the brake.

2. In a device of the class described, the combination of a shaft, a brake to arrest rotation of the shaft, a clutch for controlling transmission of power to the shaft, manually operated mechanism for first releasing the brake and then setting the clutch, and means adjustable to prevent movement of the manually operated mechanism to set the clutch while permitting release of the brake.

3. In a device of the class described, the combination of a shaft, a brake to arrest rotation of the shaft, a clutch for controlling transmission of power to the shaft, manually operated mechanism for first releasing the brake and then setting the clutch, and means adjustable at the will of the operator to prevent or permit movement of the manually operated mechanism to set the clutch while permitting release of the brake.

4. In a starting and stopping mechanism, a drive shaft, treadle controlled power actuated means for operating the drive shaft, manually actuated means for operating the drive shaft, and connections between the power means and the manual means positioned by a preliminary movement of the manually actuated means for rendering the power actuated means ineffectual.

5. In a starting and stopping mechanism, the combination of a shaft, a treadle controlled power actuated means for operating the shaft, manually actuated means for operating the shaft, and connections between the power means and the manual means which render actuation of the treadle ineffectual to start the power actuated means while the manually actuated means is being used to operate the shaft.

6. In a starting and stopping mechanism, the combination of a drive shaft, a clutch, means for actuating the clutch to operate the drive shaft by power, manually actuated means for operating the drive shaft, means for locking the manual means in inoperative condition when the shaft is operated by power, and means rendered effectual by a preliminary movement of the manual means from locked position for rendering the clutch actuating means ineffectual to apply the power.

7. In a starting and stopping mechanism, the combination of a shaft, a brake to arrest rotation of the shaft, power means and manual means for operating the shaft alternatively, and means constructed and arranged to permit release of the brake while preventing operative connection between the shaft and one of said actuating means while the other of said actuating means is operatively connected thereto.

8. In a starting and stopping mechanism, the combination of a shaft, a brake to arrest rotation of the shaft, a clutch for controlling the transmission of power to the shaft, manual means adapted to be operatively connected to said shaft, and means for permitting release of the brake while preventing operative connection between the manual means and the shaft while the clutch is operatively connected to the shaft.

9. In a starting and stopping mechanism, the combination of a transmission shaft, power means for operating the shaft, manual means for operating the shaft, a sleeve on the shaft, and means for connecting the sleeve and shaft to render the shaft operative by the manual means and rendering the power means ineffectual to turn the shaft.

10. In a starting and stopping mechanism, the combination of a transmission shaft, power means and manual means for operating the shaft, each to the exclusion of the other, a treadle for throwing in the power means, a hand piece in inoperative position, and mechanism actuated by the hand piece when it is moved from inoperative position for rendering the power means ineffectual.

11. In a starting and stopping mechanism, the combination of a transmission shaft, power means and manual means for operating the shaft each to the exclusion of the other, a treadle for throwing in the power means, a hand piece for throwing in and operating the manual means, means for locking the hand piece in inoperative position while the power means is capable of being applied to operate the machine, means for preventing manual operation of the shaft by the hand piece after it is unlocked and until the hand piece is given a preliminary movement, and means actuated by preliminary movement of the hand piece for rendering the power means ineffectual.

12. In a starting and stopping mechanism, the combination of a shaft, a brake to arrest rotation of the shaft, means for transmitting power to the shaft, manual means for operating the shaft, a treadle for throwing in the power means and releasing the brake, and means common to the power means and the manual means for rendering one of them ineffectual to turn the shaft while the other is effectual, the means common to the power means and the manual means being ineffectual to prevent the release of the brake by depressing the treadle.

13. In a starting and stopping mechanism, the combination of a shaft, a brake to arrest rotation of the shaft, power means and manual means for operating the shaft alternatively, and means for preventing operative connection between the shaft and the manual means while the power means is operatively connected thereto, the means for preventing operative connection between the shaft and the manual means being ineffectual to prevent the release of the brake.

14. In a stopping and starting mechanism, a rotary driven member, a brake for stopping the member, a plunger which is reciprocated by the rotary member, a swinging arm between the plunger and the brake, and treadle actuated means for operatively connecting the swinging arm and plunger to cause the arm to be swung by the plunger and apply a braking pressure to the member.

15. In a treadle operated stopping and starting mechanism, a rotary driven member, a brake for stopping the member, a plunger which is reciprocated by the rotary member, a swinging arm between the plunger and the brake, and a latch adapted to connect the plunger and the swinging arm when the treadle is actuated to stop the machine and cause the arm to move about its swinging point to apply the brake.

16. In a stopping and starting mechanism, a rotary driven member, a brake for stopping the member, a plunger which is reciprocated by the rotary member, a pivotally mounted pressure transmitting arm between the plunger and brake normally held in position with the brake inactive, and a treadle actuated latch mounted on said arm and arranged to engage the plunger to apply the brake.

17. In a stopping and starting mechanism, a rotary driven member, a brake for stopping the member, a plunger which is reciprocated by the rotary member, a pivotally mounted pressure transmitting arm between the plunger and the brake, a catch adjustably connected to the plunger, a latch carried by the pivoted arm, and treadle controlled means for placing the latch and the catch in operative relation to apply the brake by swinging movement of the arm when the machine is to be stopped.

18. In a stopping and starting mechanism, a rotary driven member housed within a column, a brake housed within the column for stopping the member, a plunger reciprocated by the rotary member, and a swinging pressure transmitting arm operatively connected to the plunger and arranged to be moved by the plunger to apply the brake to stop the machine.

19. In a stopping and starting mechanism, a column, a rotary driven member housed within the column, a brake housed within the column for stopping the member, a plunger reciprocated by the rotary member, and a swinging pressure transmitting arm operatively connected to the plunger and arranged to be moved by the plunger to apply the brake when the machine is to be stopped.

THOMAS H. SEELY.